US009881430B1

(12) United States Patent
Shah et al.

(10) Patent No.: US 9,881,430 B1
(45) Date of Patent: Jan. 30, 2018

(54) DIGITAL TWIN SYSTEM FOR A COOLING SYSTEM

(71) Applicant: General Electric Company, Schenectady, NY (US)

(72) Inventors: Tapan Shah, Bangalore (IN); Suresh Govindappa, Lawrence Park, PA (US); Paul Nistler, Lawrence Park, PA (US); Babu Narayanan, Bangalore (IN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 15/438,866

(22) Filed: Feb. 22, 2017

(51) Int. Cl.
*G07C 5/08* (2006.01)
*F01P 11/14* (2006.01)
(Continued)

(52) U.S. Cl.
CPC ....... *G07C 5/0808* (2013.01); *B60H 1/00735* (2013.01); *F01P 11/14* (2013.01); *F01P 11/16* (2013.01); *F01P 11/18* (2013.01); *G01M 15/048* (2013.01); *G01M 15/09* (2013.01); *G05B 17/02* (2013.01); *G06F 17/5009* (2013.01);
(Continued)

(58) Field of Classification Search
CPC ......... G07C 5/0808; F01P 11/14; F01P 11/16; F01P 11/18; F01P 2025/60; G01M 15/048; G01M 15/09; B60H 1/00735; G05B 17/02; G06F 17/5018; G06F 17/5095; G06F 17/5009; G06F 2217/16
See application file for complete search history.

(56) References Cited

U.S. PATENT DOCUMENTS 3,694,934 A * 10/1972 Barton .................. G09B 25/02
434/373
4,062,231 A 12/1977 Mercik, Jr. et al.
(Continued)

FOREIGN PATENT DOCUMENTS

CN 202690211 U 1/2013
CN 104791074 A 7/2015

OTHER PUBLICATIONS

Banks et al., "Failure Modes and Predictive Diagnostics Considerations for Diesel Engines", Defense Technical Information Center Compilation Part Notice ADP013484, pp. 93-102, Apr. 2-5, 2001.
(Continued)

*Primary Examiner* — Russell Frejd
(74) *Attorney, Agent, or Firm* — Pabitra K. Chakrabarti (57) ABSTRACT

A system includes plural, different sensors configured to be operably connected to a first vehicle. The sensors obtain status data indicative of a state of a cooling system of the first vehicle. The system includes a digital twin system having processors configured to modify the status data having sampling rates or resolutions that differ such that the status data that is modified has a common sampling rate resolution as that of other data. The processors create a digital twin matrix of the status data. The digital twin matrix is indicative of the state of the cooling system. The processors also determine a health score of the cooling system or simulate operation of the cooling system based on the digital twin matrix. The digital twin system is configured to change or control actual operation of the cooling system based on the health score or the operation that is simulated.

20 Claims, 4 Drawing Sheets

(51) Int. Cl.
    *F01P 11/16*         (2006.01)
    *F01P 11/18*         (2006.01)
    *G01M 15/04*       (2006.01)
    *G01M 15/09*       (2006.01)
    *B60H 1/00*          (2006.01)
    *G06F 17/50*        (2006.01)
    *G05B 17/02*        (2006.01)

(52) U.S. Cl.
    CPC ...... *G06F 17/5018* (2013.01); *G06F 17/5095* (2013.01); *F01P 2025/60* (2013.01); *G06F 2217/16* (2013.01)

(56) References Cited

U.S. PATENT DOCUMENTS

| | | | |
|---|---|---|---|
| 5,353,653 A | 10/1994 | Watanabe et al. | |
| 5,526,871 A | 6/1996 | Musser et al. | |
| 5,845,272 A | 12/1998 | Morjaria et al. | |
| 6,634,000 B1 | 10/2003 | Jammu et al. | |
| 6,701,232 B2 * | 3/2004 | Yamaki | G01M 15/05 701/33.8 |
| 6,847,187 B2 * | 1/2005 | Kumar | H02H 7/0852 318/471 |
| 7,189,061 B2 * | 3/2007 | Hong | F04D 29/326 29/407.05 |
| 7,455,099 B2 | 11/2008 | Osborn et al. | |
| 8,577,822 B2 | 11/2013 | Kusiak et al. | |
| 8,875,561 B2 * | 11/2014 | Worden | F01P 11/18 73/40 |
| 9,151,695 B2 * | 10/2015 | Worden | F01P 11/18 |
| 2013/0085734 A1 * | 4/2013 | Shieh | G06F 17/5009 703/8 |
| 2014/0100703 A1 | 4/2014 | Düll et al. | |
| 2016/0010537 A1 * | 1/2016 | Strode | G07C 5/0808 701/114 |

OTHER PUBLICATIONS

Torregrosa et al., "A Methodology for the Design of Engine Cooling Systems in Standalone Applications", SAE International, pp. 01-18, 2010.

\* cited by examiner

DIGITAL TWIN SYSTEM FOR A COOLING SYSTEM

FIELD

The subject matter described herein relates to cooling systems.

BACKGROUND

Various powered systems may include cooling systems to maintain temperatures of components of the powered systems at safe levels. For example, vehicles may include cooling system that pump fluid coolant (e.g., liquid coolant or air) through and/or around engines, inverters, transformers, motors, alternators, or the like, in order to keep the temperatures of the engines, inverters, transformers, motors, alternators, or the like, sufficiently low to prevent damage to these components.

Over time, cooling systems may become damaged and/or fail. Some vehicles may respond to failure in a cooling system by stopping movement of the vehicle. But, this can cause significant problems in some circumstances. For example, the vehicle with a failed cooling system may abruptly stop in a location that blocks movement of other vehicles, such as may occur in a mining operation or along a heavily traveled road. Failed cooling systems can lead to significant financial losses.

In order to reduce the number of cooling system failures, cooling systems need to be routinely inspected. However, routine inspections can be time consuming, leading to decreasing operating revenue and/or decreasing productivity for the customer. Furthermore, inspecting a failed cooling system to determine the root cause of the failure is difficult, time consuming, and may lead to increased repair costs.

BRIEF DESCRIPTION

In one embodiment, a system includes plural, different sensors each configured to be operably connected to a first vehicle. The sensors also are configured to obtain status data indicative of a state of a cooling system of the first vehicle, wherein at least some of the status data obtained by the different sensors differs in one or more of sampling rates or resolutions for at least two of the different sensors. The system includes a digital twin system having one or more processors configured to modify the at least some of the status data having the one or more of sampling rates or resolutions that differ for at least two of the different sensors such that the at least some of the status data that is modified has one or more of a common sampling rate or a common resolution as that of other data in the status data. The one or more processors are configured to create a digital twin matrix of the status data that is obtained and the at least some of the status data that is modified. The digital twin matrix is indicative of the state of the cooling system of the first vehicle. The one or more processors also configured to one or more of determine a health score of the cooling system of the first vehicle based on the digital twin matrix, or simulate operation of the cooling system of the first vehicle based on the digital twin matrix. The digital twin system is configured to change or control actual operation of the cooling system of the first vehicle based on one or more of the health score or the operation of the cooling system that is simulated.

In one embodiment, a method includes obtaining, with plural, different sensors operably connected to a first vehicle, status data indicative of a state of a cooling system of the first vehicle. At least some of the status data obtained by the different sensors differs in one or more of sampling rates or resolutions for at least two of the different sensors. The method includes modifying the at least some of the status data having the one or more of sampling rates or resolutions that differ for at least two of the different sensors such that the at least some of the status data that is modified has one or more of a common sampling rate or a common resolution as that of other data in the status data. The method includes creating a digital twin matrix of the status data that is obtained and the at least some of the status data that is modified. The digital twin matrix is indicative of the state of the cooling system of the first vehicle. The method also includes one or more of determining a health score of the cooling system of the first vehicle based on the digital twin matrix, or simulating operation of the cooling system of the first vehicle based on the digital twin matrix. The method also includes changing or controlling actual operation of the cooling system of the first vehicle based on one or more of the health score or the operation of the cooling system that is simulated.

In one embodiment, a system includes a first sensor configured to be operably connected to a vehicle and configured to obtain first status data indicative of a state of a cooling system of the vehicle. The system includes a different, second sensor configured to be operably connected to the vehicle and configured to obtain different, second status data indicative of the state of the cooling system of the vehicle, wherein the second sensor is configured to obtain the second status data at one or more of a different sampling rate or resolution than the first sensor is configured to obtain the first status data. The system includes one or more processors configured to modify the first status data, the second status data, or both the first status data and the second status data to create modified status data such that the first status data and the second status data in the modified status data have one or more of a common sampling rate or a common resolution. The one or more processors also are configured to create a digital twin matrix of the modified status data. The digital twin matrix is indicative of the state of the cooling system of the vehicle. The one or more processors also are configured to one or more of determine a health score of the cooling system of the vehicle based on the digital twin matrix or simulate operation of the cooling system of the vehicle based on the digital twin matrix. The digital twin system is configured to change or control operations of the cooling system of the vehicle based on one or more of the health score or the operation of the cooling system that is simulated.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein provide systems and methods that quantify a state of health of a cooling system of a vehicle. The cooling system of a vehicle maintains temperatures of components of the vehicle at safe travels. To determine a health score of the cooling system of the vehicle, the systems and methods generate a digital twin of the cooling system of the vehicle.

The digital twin is a numerical representation of the cooling system of the vehicle that is indicative of the state of the cooling system. In order to generate the digital twin, the systems and methods obtain status data from plural, different sensors operably connected with the first vehicle. The status data is indicative of a state of the cooling system of the vehicle. For example, the status data may be indicative of a state of health, usage, or the like, of the cooling system of the vehicle. The status data obtained from different sensors may differ in one or more of sampling rates or resolutions for at least two of the different sensors. For example, the status data obtained from a first sensor may be at a first frequency and a first sampling rate, and the status data obtained from a second sensor may be at a second, different frequency and second sampling rate. The systems and methods modify at least some of the status data having the different sampling rates or resolutions such that the modified status data has a common sampling rate or a common sampling resolution. The systems and methods generate a digital twin matrix using the status data that is obtained and at least some of the status data that is modified.

The systems and methods determine a health score of the cooling system of the vehicle based on the digital twin matrix of the cooling system. For example, a low health score of the cooling system may indicate that the cooling system of the vehicle may be unable to perform an impending task. Alternatively, a high health score of the cooling system may indicate that the cooling system of the vehicle may be capable of performing the impending task. Optionally the systems and methods may predict a likelihood of failure of the cooling system based on the health score of the cooling system. For example, a low health score may indicate the cooling system will likely fail under a particular set of circumstances (e.g., environmental factors, load factors, distance of a trip, or the like). Alternatively, a high health score may indicate the cooling system will not likely fail under a particular set of circumstances.

Optionally, the systems and methods simulate operation of the cooling system of the vehicle based on the digital twin matrix. The simulation can be based on a variety of environmental or equipment factors representative of a forecasted environment in which the cooling system of the vehicle may be subjected to. For example, environmental factors may represent temperature, humidity, wind, precipitation, or the like, or equipment factors may represent throttle setting, brake setting speed settings, radiator fan speed, pump speed, coolant flow rate, cargo load, terrain, distance, speed limitations, or the like. Optionally, the systems and methods may predict a likelihood of failure of the cooling system based on the operation that is simulated. For example, the simulated operation may indicate whether the cooling system will likely fail or not fail under a simulated set of circumstances (e.g., environmental factors, load factors, distance of a trip, or the like.

The systems and methods change or control actual operation of the cooling system of the vehicle based on one or more of the health score of the cooling system or the operation of the cooling system that is simulated. For example, a simulated operation of the cooling system may indicate that the cooling system of the vehicle will likely fail when subjected to the simulated factors. The system and methods may change an operation of the cooling system in order to avoid subjecting the vehicle to the simulated factors.

At least one technical effect of the subject matter described herein is the systems and methods can prevent failure of the cooling system of the vehicle system due to overheated engines by utilizing the digital twin matrix to determine the health score and simulate operation of the cooling system. This can result in reduced downtime of the vehicle (e.g., relative to not determining a health score or simulating operation of the cooling system). At least one technical effect isolates poor performing systems of a vehicle. At least one technical effect simulates a performance of a cooling system of a second vehicle for an impending trip. At least one technical effect predicts a failure of the cooling system of the vehicle, or predict a failure of a cooling system of a second vehicle. This can result in reduced downtime of additional vehicles of a vehicle fleet system.

While the descriptions herein focus on determining a health score or simulating operation of a cooling system operating to cool components of the vehicle, not all embodiments are limited to vehicular cooling systems. One or more embodiments may be used with stationary powered systems and/or may be used to determine a health score or simulate operations of an alternative system of a vehicle.

Figure 1:
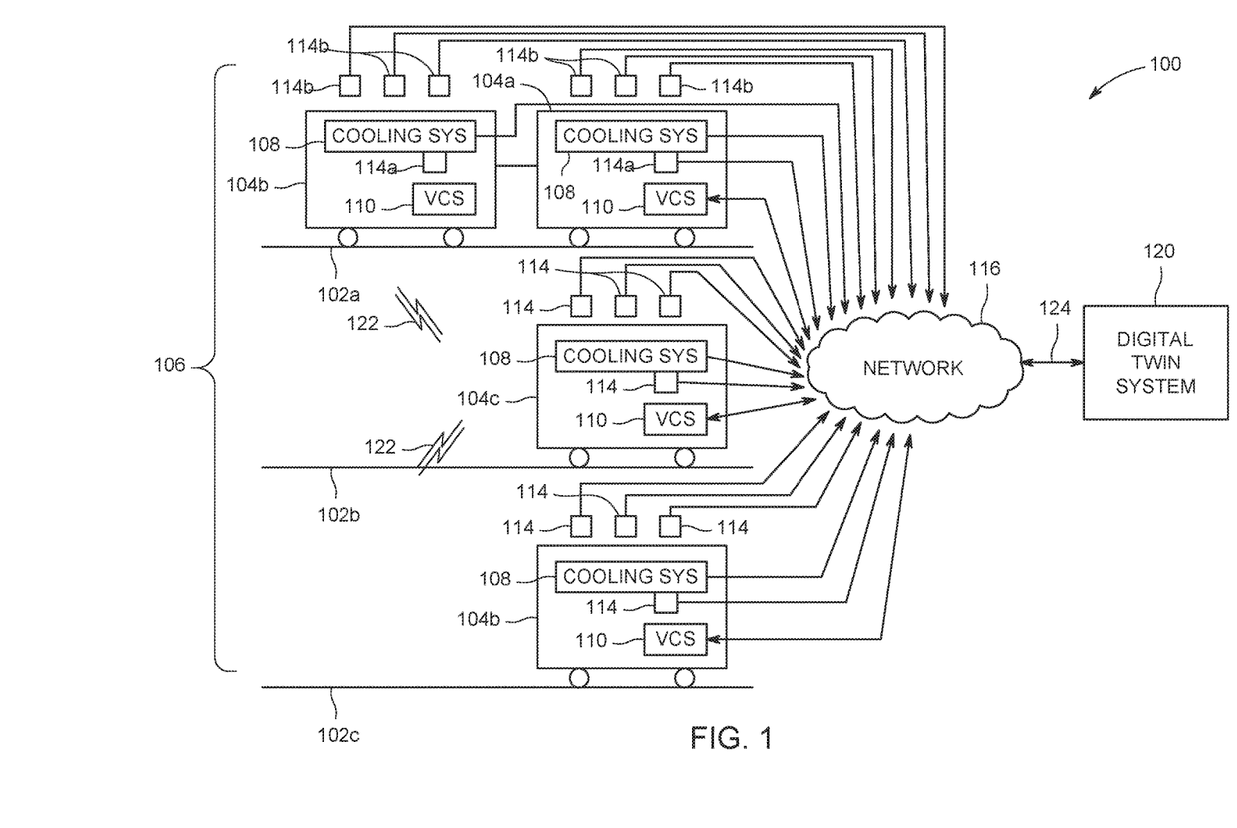
FIG. 1 illustrates a schematic illustration of a system of a vehicle system in accordance with one embodiment.

FIG. 1 illustrates one embodiment of a system 100 that includes a vehicle fleet system 106. The illustrated vehicle fleet system 106 includes propulsion-generating vehicles 104. Optionally, the fleet system 106 may include one or more non-propulsion generating vehicles. One or more of the vehicles 104 of the fleet system 106 may be mechanically coupled with each other, or may not be mechanically coupled with each other. In the illustrated embodiment, the fleet system 106 includes the vehicles 104a-d, wherein the vehicles 104a, 104b are mechanically coupled with each other and travel together along a route 102a, the vehicle 104c is not mechanically coupled with any other vehicle and travels along a route 102b, and the vehicle 104d is not mechanically coupled with any other vehicle and travels along a route 102c. Alternatively, the vehicles 104 of the fleet system 106 may be arranged in any alternative configuration.

The vehicles 104a-d are shown as locomotives, and the fleet system 106 is shown as a locomotive system in the illustrated embodiment. Alternatively, the vehicles 104a-d may represent other vehicles, such as automobiles, rail vehicles, trucks, marine vessels, aerial drones, other aerial vehicles, or the like, and the fleet system 106 can represent a grouping or coupling of these vehicles. The number and arrangement of the vehicles 104a-d in the vehicle fleet system 106 are provided as one example and are not intended as limitations on all embodiments of the subject matter described herein.

The vehicles 104 each include a vehicle control system 110 disposed onboard the vehicles 104. The vehicle control system 110 can include hardware circuits or circuitry that include and/or are connected with one or more processors. The vehicle control system 110 can control or limit movement of the vehicles 104 and/or the fleet system 106 that includes the vehicles 104 based on one or more limitations. For example, the vehicle control system 110 can prevent the vehicles 104 from entering a restricted area, can prevent the vehicles 104 from exiting a designated area, can prevent the vehicles 104 from traveling at a speed that exceeds an upper speed limit, can prevent the vehicles 104 from traveling at a speed less than a lower speed limit, can prevent the vehicles 104 from traveling according to a designated trip plan generated by an energy management system, can prevent the vehicles 104 from traveling according to one or more control signals received from a digital twin system 120, or the like. The vehicle control system 110 will be discussed in more detail below with FIG. 2.

The vehicles 104 each include a cooling system 108 disposed onboard the vehicles 104. The cooling system 108 cools one or more components of the vehicle 104. The cooling system 108 may include one or more blowers (e.g., fans) that move air and/or pumps that move fluids (e.g., air or liquid coolant) in order to cool components of the vehicle 104. These components can include parts of a propulsion subsystem of the vehicle control system 110 such as one or more engines, brakes, inverters, transformers, motors, alternators, or the like. The vehicle control system 110 may monitor and/or control operation of the cooling system 108. For example, the vehicle control system 110 may increase, decrease, stop, limit, or the like, the amount of coolant (e.g., air or liquid coolant) that flows through the cooling system 108 of the vehicle 104.

The vehicles 104 each include one or more sensors 114 disposed onboard and/or off-board the vehicles 104 that are operably connected with the vehicle 104. The sensors 114 include hardware circuits or circuitry and/or software that can include and/or are connected with one or more processors. The sensors 114 can obtain status data of the vehicles 104 that is indicative of a state of the vehicle 104. For example, the status data may be indicative of the state of one or more of the cooling system 108, or other system of the vehicle 104. The sensors 114 can include one or more sensing devices positioned on, around, and/or near the vehicle 104. For example, in the illustrated embodiment, the vehicle 104a includes a sensor 114a disposed onboard the vehicle 104a, and three sensors 114b disposed off-board the vehicle 104a. Optionally, the one or more sensors 114 may be disposed onboard and/or off-board the vehicle 104. The sensors 114a, 114b can obtain status data indicative of the state of the cooling system of the vehicle 104a. Optionally, the one or more sensors 114 may obtain status indicative of the state of another system of the vehicle.

The status data obtained by the sensors 114 provides various types of data of the vehicle 104. The status data may include data indicative of the cooling system 108 including a current engine oil inlet temperature, engine water inlet temperature, manifold air temperature, throttle setting, fan speed, fuel temperature, turbo speed, or the like. Additionally or alternatively, the status data may include various types of data of the environment in which the vehicle 104 is subjected to. For example, the status data may include the state of the vehicle 104 including a global positioning system (GPS) location, ambient temperature, barometric pressure, altitude, precipitation, humidity, or the like.

The sensors 114 may obtain status data at varying sampling rates, varying resolutions, or the like. For example, the sensors 114 may obtain status data every $\frac{1}{100}^{th}$ of a second, every second, every minute, every hour, every 5 hours, every 24 hours, or the like. Optionally, one or more of the sensors 114 may obtain status data at a common or unique rate. For example, the sensor 114a may be a first sensor 114a and may obtain status data of the vehicle 104 at a first sampling rate, a first frequency (e.g., every $\frac{1}{100}^{th}$ of a second), or a first resolution. The sensors 114b may be second sensors 114b and may obtain status data of the vehicle 104 at a different sampling rate (e.g., lower or higher sampling rate), different frequency, or a different resolution than the first sensor 114a. For example, the first sensor 114a may obtain status data at a first frequency (e.g., every $\frac{1}{100}^{th}$ of a second), and the second sensors 114b may obtain status data at a different frequency (e.g., every second), such that the first sensor 114a obtains status data having a higher resolution than the status data obtained by the second sensors 114b. The sampling rate and the resolution of the status data will be discussed in more detail below with FIG. 4.

The system 100 includes a digital twin system 120. The digital twin system 120 is disposed off-board the vehicle fleet system 106. Optionally, the digital twin system 120 may be disposed onboard one or more of the vehicles 104 or the fleet system 106. The digital twin system 120 can include hardware circuits or circuitry and/or software that include and/or are connected with one or more processors. The digital twin system 120 can one or more of receive the status data from the sensors 114, modify the status data obtained by the sensors 114 into a common sampling rate or common frequency, or create a digital twin matrix of one or more of the vehicles 104. Optionally, the digital twin system 120 can one or more of determine a health score of the cooling system 108 of one or more vehicles 104, or can simulate operation of one or more of the cooling system 108 of vehicle 104. Optionally, the digital twin system 120 can change and/or control operation of the cooling systems 108 of the vehicles 104 based on the health score or the simulated operation of the cooling system 108 of the vehicles 104. The digital twin system 120 will be discussed below in more detail with FIGS. 3 and 4.

The system 100 includes a network system 116. The network system 116 is at least one of a website, a server, a computer, a cloud-service, a processor and memory, or a computing device connected to the Internet. The network can be coupled to one or more devices via wired or wireless connectivity in which data communications are enabled between the network and at least one of a second network, a subnetwork of the network 116, of a combination thereof. Multiple networks can be used with the system 100 and data communication on networks can be selected based on application specific criteria. The network 116 can transmit/receive data communicated by one or more of the fleet system 106, the vehicles 104, cooling systems 108, the vehicle control system 110, the sensors 114, the digital twin system 120, or a combination of two of more thereof. For example, the network 116 may receive the status data communicated by one or more of the sensors 114, and transmit the status data to the digital twin system 120. Additionally or alternatively, the network 116 may receive a control signal (e.g., radiator fan speed, pump speed, intercoolant fan speed, coolant flow rate, or the like) communicated by the digital twin system 120, and transmit the control signal to the vehicle control system 110 in order to change and/or control operation of the cooling system 108 of the vehicle 104.

Figure 2:
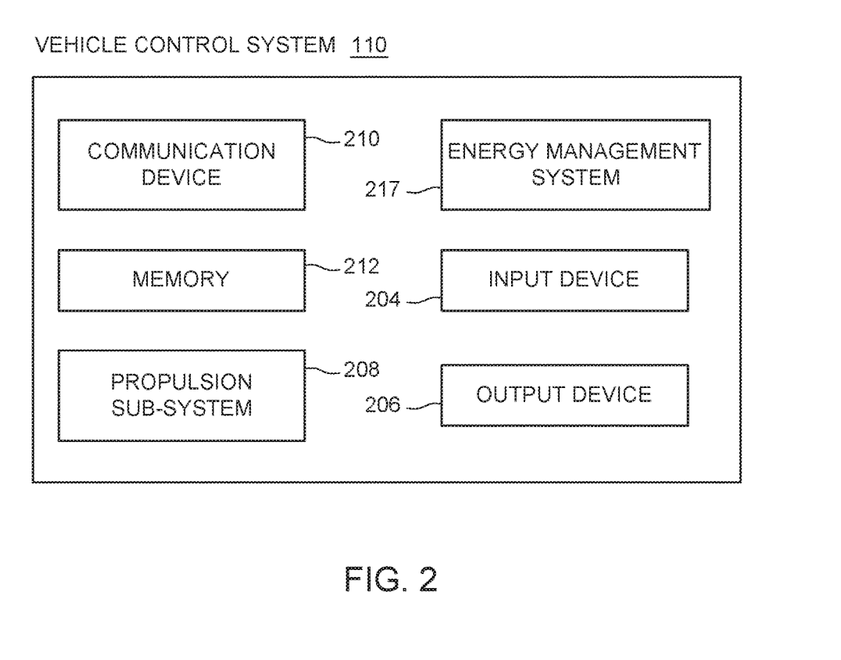
FIG. 2 illustrates a schematic illustration of a vehicle control system in accordance with one embodiment.

FIG. 2 is a schematic illustration of the vehicle control system 110 disposed onboard the vehicles 104 in accordance with one embodiment. The vehicle control system 110 controls operation of the vehicles 104. The vehicle control system 110 can include or represent one or more hardware circuits or circuitry that include, are connected with, or that both include and are connected with one or more processors, controllers, or other hardware logic-based devices. The vehicle control system 110 is connected with an input device 204 and an output device 206. The vehicle control system 110 can receive manual input from an operator of the vehicle 104 through the input device 204, such as a touchscreen, keyboard, electronic mouse, microphone, or the like. For example, the vehicle control system 110 can receive manually input changes to the tractive effort, braking effort, speed, power output, and the like, from the input device 204. The vehicle control system 110 may receive a single instance of an actuation of the input device 204 to initiate the establishment of a communication link 122 between the vehicles 104 in the fleet system 106. The communication links 122 may be established between one or more of the vehicles 104a-d of the fleet system 106. For example, the vehicles 104a, 104b may communicate with the vehicle 104c across the communication link 122.

The vehicle control system 110 can present information to the operator of the vehicles 104 using the output device 206, which can represent a display screen (e.g., touchscreen or other screen), speakers, printer, or the like. For example, the vehicle control system 110 can present the identities and statuses of the vehicles 104a-d, identities of the missing vehicles (e.g., those vehicles from which the vehicle 104a has not received the status), contents of one or more command messages, or the like.

The vehicle control system 110 is connected with a propulsion subsystem 208 of the vehicle 104. The propulsion subsystem 208 provides tractive effort and/or braking effort of the propulsion-generating vehicles 104. The propulsion subsystem 208 may include or represent one or more engines, motors, alternators, generators, brakes, batteries, turbines, and the like, that operate to propel the vehicles 104 under the manual or autonomous control that is implemented by the vehicle control system 110. For example, the vehicle control system 110 can generate control signals autonomously or based on manual input that is used to direct operations of the propulsion subsystem 208.

The vehicle control system 110 is connected with a communication device 210 and a memory 212 in the vehicle 104. The memory 212 can represent an onboard device that electrically and/or magnetically stores data. For example, the memory 212 may represent a computer hard drive, random access memory, read-only memory, dynamic random access memory, an optical drive, or the like. The communication device 210 includes or represents hardware and/or software that is used to communicate with other vehicles in the vehicle fleet system 106. For example, the communication device 210 may include a transceiver and associated circuitry (e.g., antennas) for wirelessly communicating (e.g., communicating and/or receiving) linking messages, command messages, reply messages, repeat messages, or the like. Optionally, the communication device 210 includes circuitry for communicated the messages over a wired connection, such as an electric multiple unit (eMU) line of the vehicle fleet system 106 (not shown), catenary or third rail of electrically powered vehicles, or another conductive pathway between or among the vehicles 104 in the fleet system 106.

The vehicle control system 110 may control the communication device 210 by activating the communication device 210. The vehicle control system 110 can examine the messages that are received by the communication device 210. For example, the vehicle control system 110 of the vehicle 104 can examine received command messages to determine the directive sent by one or more of additional vehicles of the fleet system 106, the digital twin system 120, or from any other system. The vehicle control system 110 implements the directive by creating control signals that are communicated to the propulsion subsystem 208 for autonomous control or present the directive to the operator on the output device 206 for manual implementation of the directive.

The vehicle control system 110 is connected with an energy management system 217. The energy management system 217 can include hardware circuits or circuitry that include and/or are connected with one or more processors. The energy management system 217 can create a trip plan for trips of the vehicles 104 and/or the vehicle fleet system 106 that includes the vehicles 104. A trip plan may designate operational settings of the propulsion-generating vehicles 104 and/or the vehicle fleet system 106 as a function of one or more of time, location, or distance along a route for a trip. Traveling according to the operational settings designated by the trip plan may reduce fuel consumed and/or emissions generated by the vehicles and/or the vehicle fleet system relative to the vehicles and/or vehicle fleet system traveling according to other operational settings that are not designated by the trip plan. The identities of the vehicles in the fleet system 106 may be known to the energy management system 217 so that the energy management system 217 can determine what operational settings to designate for a trip plan to achieve a goal of reducing fuel consumed and/or emissions generated by the vehicle fleet system 106 during the trip.

Figure 3:
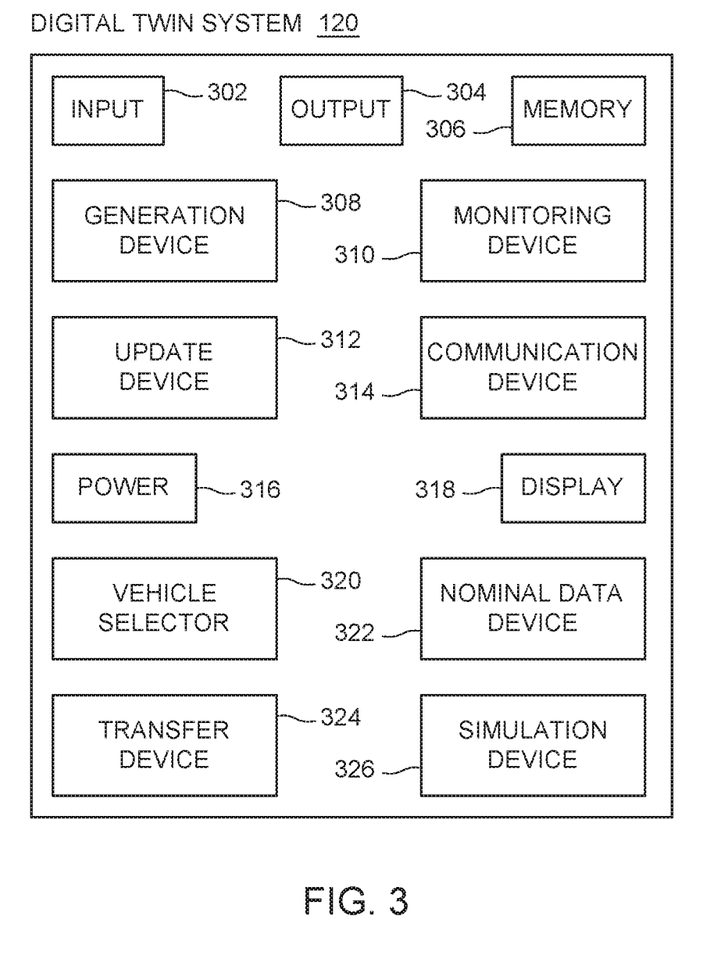
FIG. 3 illustrates a schematic illustration of a digital twin system in accordance with one embodiment.
Figure 4:
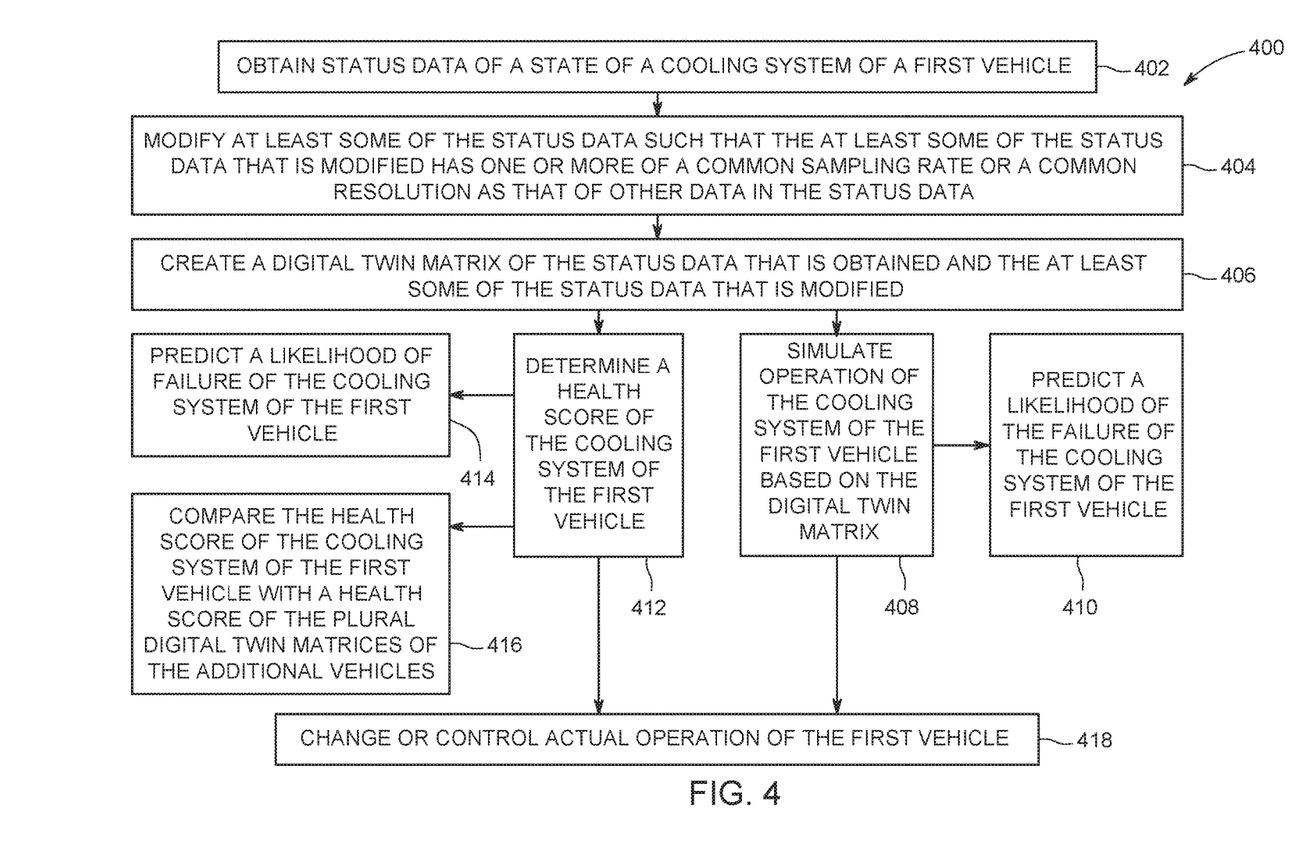
FIG. 4 illustrates a method flowchart in accordance with one embodiment.

FIG. 3 illustrates a schematic illustration of the digital twin system 120 in accordance with one embodiment. FIG. 4 illustrates a flowchart of a method 400 for operation of the digital twin system 120 in accordance with one embodiment. FIGS. 3 and 4 will be discussed in detail together.

The digital twin system 120 is connected with an input device 302 and an output device 304. The digital twin system 120 can receive manual input from an operator of the digital twin system 120 through the input device 302, such as a touchscreen, keyboard, electronic mouse, microphone, or the like. For example, the digital twin system 120 can receive manually input changes to status data received by the digital twin system 120 from one or more of the sensors 114 via the network 116, new status data obtained by the user of the digital twin system 120, or any alternative data. The digital twin system 120 may receive a single instance of an actuation of the input device 302 to initiate the establishment of a communication link 124 between the network 116 and the digital twin system 120.

The digital twin system 120 can present information to the vehicle control systems 110 using the output device 304, which can represent a display screen (e.g., a touchscreen or other screen), speakers, printer, or the like. For example, the digital twin system 120 can present the identities and statuses of the vehicles 104, identities of the missing vehicles 104 (e.g., those vehicles from which the digital twin system 120 has not received the status), identities and statuses of the vehicles 104 having one or more problems with the cooling system 108, contents of one or more command messages, or the like.

The digital twin system 120 is connected with a communication device 314 and a memory 306. The memory 306 can represent a device that electrically and/or magnetically stores data. For example, the memory 306 may represent a computer hard drive, random access memory, read-only memory, dynamic random access memory, an optical drive, or the like. The memory 306 can store the status data of cooling system 108, the vehicles 104, or the fleet system 106 that is obtained by the sensors 114. The communication device 314 includes or represents hardware and/or software that is used to communicate with the vehicle control systems 110 in the fleet system 106 via the network 116. For example, the communication device 314 may include a transceiver and associated circuitry (e.g., antennas) for wirelessly communicating (e.g., communicating and/or receiving) linking messages, command messages, reply messages, control signals, statuses of vehicles, identities of vehicles 104 of the fleet system 106, problems with vehicles and/or cooling systems 108, or the like. Optionally, the communication device 314 includes circuitry for communicating the messages over a wired connection, or another conductive pathway between the digital twin system 120 and the one or more vehicles 104.

The digital twin system 120 may control the communication device 314 by activating the communication device 314. The digital twin system 120 can examine the status data that is received by the communication device 314. For example, the digital twin system 120 can examine the status data of the cooling system 108 of one or more of the vehicles 104a-d obtained by the one or more sensors 114.

The digital twin system 120 can include one or more displays 318 such as a touchscreen, display screen, electronic display, or the like. The displays 318 may visually, graphically, statistically, or the like, display information to the operator of the digital twin system 120. Additionally or alternatively, the digital twin system 120 may be operably connected with components or alternative systems.

The digital twin system 120 includes a vehicle selector 320. The operator of the digital twin system 120 can activate the vehicle selector 320 in order to select the vehicle of the fleet system 106 from which the digital twin system 120 would like to obtain status data from. For example, the operator may select to obtain status data from the vehicle 104b (e.g., herein designated a first vehicle) of the fleet system 106.

At 402 of the method 400, the one or more sensors 114 (of FIG. 1) obtain status data indicating a state of the cooling system 108 of the vehicle 104. For example, the sensors 114a, 114b may obtain status data indicative of the cooling system 108 of the first vehicle 104b including a current engine oil inlet temperature, engine water inlet temperature, manifold air temperature, throttle setting, fan speed, fuel temperature, turbo speed, or the like. Additionally or alternatively, the sensors 114a, 114b may obtain status data indicative of the environment including a global positioning system (GPS) location, environmental temperature, barometric pressure, altitude, or the like. The sensors 114a, 114b transmit the status data to the digital twin system 120 via the network 116. For example, the input device 302 of the digital twin system 120 receives the data obtained by the sensors 114 via the communication device 314. Optionally, the output device 304 or the display 318 may display the status data to the operator of the digital twin system 120. The memory 306 stores the status data received by the digital twin system 120. For example, the memory 306 stores the status data of the first vehicle 104b.

The sensors 114 may obtain status data of the first vehicle 104b at varying sampling rates, varying resolutions, or the like. For example, the sensor 114a onboard the vehicle 104b may obtain status data at a first sample rate or first frequency, and the sensors 114b off-board the vehicle 104b may obtain status data at a second sampling rate or second frequency that is different than the first sample rate or frequency. For example, the sensor 114a may obtain status data at a higher resolution (e.g., higher frequency of sensed data) than the sensors 114b.

At 404, the digital twin system 120 modifies the status data having varying sampling rates and varying resolutions with a nominal data device 322 such that the status data that is modified has one or more of a common sampling rate (e.g., common frequency) or a common resolution as the other status data. The nominal data device 322 can include hardware circuits or circuitry and/or software that include and/or are connected with one or more processors. The nominal data device 322 can modify at least some of the obtained status data by up-sampling and/or down-sampling the varying status data to a common sampling rate or a common resolution. For example, the nominal data device 322 can determine a common sampling rate (e.g., 1 Hz). If one or more of the sensors 114a, 114b obtained status data of the first vehicle 104b at a sampling rate greater than 1 Hz, the nominal data device 322 can down-sample the status data. Alternatively, if one or more of the sensors 114a, 114b obtained status data of the first vehicle 104b at a sampling rate lower than 1 Hz, the nominal data device 322 can up-sample the status data. Optionally, the nominal data device 322 may modify the status data obtained only by the sensor 114b, may modify the status data obtained only by the sensors 114b, or may modify the status data obtained by both the sensor 114a and the sensors 114b.

At 406, the digital twin system 120 creates a digital twin matrix with a generation device 308. The digital twin matrix is indicative of the state of the cooling system 108 of the first vehicle 104b. The generation device 308 can include hardware circuits or circuitry and/or software that include and/or are connected with one or more processors. The generation device 308 can create the digital twin matrix using the status data that is obtained and the status data that is modified (e.g., modified by the nominal data device 322). The digital twin matrix can be derived using physics principles to determine an empirical linear dynamic model for the cooling system 108 which relates the engine coolant temperatures (e.g., engine oil inlet temperature, engine water inlet temperature, manifold air temperature, or the like) to environmental conditions (e.g., ambient temperature, air pressure, altitude, or the like), engine load and control parameters (e.g., radiator fan speed, intercoolant fan speed, or the like). For example, the generation device 308 creates the digital twin matrix by transforming the obtained status data and the modified status data of the cooling system 108 of the first vehicle 104b using a design model statistical technique. The following model is assumed:

$$x(t+1)=A(t)x(t)+B(t)u(t)+w(t)$$

$$y(t)=C(t)x(t)+D(t)u(t)+v(t)$$

The variable u(t) is a vector of transformed sensor measurements. For example, the vector u(t) may represent one or more of the altitude, radiator fan speed, gross horse power (GHP), ambient temperature (AT), revolutions per minute (RPM), barometric air pressure (BAP), manifold air pressure (MAP), fuel valve (FV), or the like, at a given time "t". The variable y(t) is a vector of coolant temperatures. For example, y(t) may represent one or more of the engine lube inlet temperature, engine water inlet temperature, engine oil inlet temperature, manifold air temperature, or the like, at a given time "t". The variable x(t) is a vector of identified internal states. For example, x(t) may represent one or more of the engine load, or the like, at a given time "t". The variables w(t) and v(t) represent noise variables at a given time "t". Using a mathematical technique (e.g., a system identification technique, or the like), the generation device 308 estimates the digital twin matrix for the cooling system 108 of the first vehicle 104b. The digital twin matrix includes the matrices A(t), B(t), C(t), and D(t). For example, the digital twin matrix is a numerical representation of the cooling system 108 of the first vehicle 104b at any given time "t".

Additionally or alternatively, the generation device 308 may create a digital twin matrix of one or more of the additional, other vehicles 104a, 104c, 104d of the fleet system 106. For example, by selecting the one or more additional vehicles 104a, 104c, 104d using the vehicle selector 320 of the digital twin system 120, the digital twin system 120 may obtain status data of the additional vehicles and the generation device 308 may create a digital twin matrix for each of the additional vehicles 104a, 104c, 104d. Additionally or alternatively, the memory 306 may store the digital twin matrices of each of the vehicles 104a-d. Optionally, the memory 306 may store the status data of each of the vehicles 104a-d. Optionally, the memory 306 may store the combined status data of the fleet system 106.

The digital twin system 120 includes a transfer device 324. In one embodiment, the digital twin system 120 may transfer insight of the additional vehicles 104a, 104c, 104d to the first vehicle 104b using the transfer device 324. For example, the vehicle 104d may have experienced a situation that the first vehicle 104b has not yet experienced. For example, the vehicle 104d may have traveled in a different terrain, been subjected to different environmental conditions, experienced different loads to the cooling system, or the like. The transfer device 324 can transfer the insight of the vehicle 104d having experienced these conditions, to the first vehicle 104b that has not yet experienced these conditions. Optionally, the transfer device 324 of the digital twin system 120 may be able to transfer insight of any of the vehicles 104a, 104c, 104d to the first vehicle 104b. The following formula may be used:

$$A_x(t) = \alpha A(t) + (1-\alpha)\Sigma A_1(t)$$

The variable $A_x(t)$ represents that matrix A(t) of the first vehicle 104b, and the variable a represents a transfer coefficient. A similar formula may be used to transfer insight of the other variable matrices. Additionally or alternatively, the transfer device 324 may transfer insight to one or more of the vehicles 104a-d of the fleet system 106 using the digital twin matrices of one or more of the vehicles 104a-d. Additionally or alternatively, the transfer device 324 may transfer insight to one or more vehicles 104a-d using data manually input into the input device 302 by a user of the digital twin system 120, using data obtained from a vehicle outside of the fleet system 106, using data obtained from an alternative, different fleet system (not shown), or using data obtained from any other source.

The digital twin system 120 includes an update device 312. In one embodiment, the update device 312 may update the digital twin matrix of the first vehicle 104b using new status data obtained by the one or more different sensors 114. For example, as the sensors 114a, 114b continue (e.g., periodically, randomly, continuously, or the like) to obtain status data of the cooling system 108 of the first vehicle 104b, the digital twin system 120 continues to receive the obtained status data. The update device 312 updates the digital twin matrix of the first vehicle 104b using the new status data of the cooling system 108 of the first vehicle. For example, the update device 312 may continually update the status data set in a "first-in-first-out" rolling process. Optionally, the update device 312 may update the status data obtained by only the sensor 114a. Optionally, the update device 312 may update the status data using a hierarchy method. For example, the update device 312 may be able to distinguish one set of status data from a different set of status data (e.g., good and bad, old and new, or the like), data that falls outside of a target range, or the like. The update device 312 may continue to update the digital twin matrix periodically, randomly, continuously, or the like.

After the generation device 308 has created the digital twin matrix of the cooling system 108 of the first vehicle 104b, the method continues to one or more of 408 and/or 412. At 408, a simulation device 326 simulates an operation of the cooling system 108 of the first vehicle 104b based on the digital twin matrix of the cooling system 108 of the first vehicle 104b. For example, the digital twin system 120 may simulate a future scenario that the cooling system 108 of the first vehicle 104b may be subjected to. The simulated future scenario may include one or more of a forecasted cargo load of the vehicle, environmental conditions, terrain of the route (e.g., mountainous or flat), speed requirements, distance, or the like. The simulation device 326 simulates the operation of the cooling system 108 of the first vehicle 104b subjected future scenario using the digital twin matrix of the cooling system 108 of the first vehicle 104b with the forecasted conditions that are input into the digital twin system 120. Using the simulated operation of the cooling system 108 of the first vehicle 104b, the method continues to one or more of 410 or 418.

At 410, the simulation device 326 predicts a likelihood of failure of the cooling system 108 of the first vehicle 104b based on the operation that is simulated. For example, using the digital twin matrix of the cooling system 108 of the first vehicle 104b subjected to the forecasted simulated conditions, the simulation device 326 can determine whether or not the cooling system 108 will fail when subjected to the forecasted simulated conditions. The simulation device 326 may provide a calculated percentage of potential failure, may indicate a pass/fail determination, may communicate to the operator of the digital twin system 120 using the output device 304 (e.g., an alarm, a bell, vibration, verbal communication, or the like), or the like. Additionally or alternatively, the simulation device 326 may provide additional feedback to the simulation such as alternative forecasted conditions in which the cooling system 108 will not fail. For example, the simulation device 326 may inform the operator of the digital twin system 120 that by changing the cargo load, changing the distance of the trip, or the like, that the cooling system 108 of the first vehicle 104b may not be likely to fail, may have a low likelihood in failure, or the like.

At 412, a monitoring device 310 determines a health score of the cooling system 108 of the first vehicle 104b. In order to determine the health score, the monitoring device 310 compares the digital twin matrix of the cooling system 108 of the first vehicle 104b to reference data of a modeled cooling system. For example, the reference data of the modeled cooling system may include environmental reference data such as one or more of ambient temperature, altitude, barometric pressure, or the like. Additionally, the reference data may include system equipment reference data such as simulated engine oil inlet temperature data, simulated engine water inlet temperature data, simulated manifold air temperature data, or the like. The monitoring device 310 may determine that the cooling system 108 of the first vehicle 104b has a low health score if the absolute values of the digital twin matrix are high and/or if the difference between the digital twin matrix and the reference data is high. Alternatively, the monitoring device 310 may determine that the cooling system 108 of the first vehicle 104b has a high score if the absolute values of the digital twin matrix are low and/or if the difference between the digital twin matrix and the reference data is low. For example, if the digital twin matrix and the reference data are similar, within a certain range of each other, or the like, the health score of the cooling system 108 may be high, indicating a good health score (e.g., that the cooling system 108 is healthy). Alternatively, if the digital twin matrix and the reference data are dissimilar, outside of a certain range of each other, or the like, the health score of the cooling system 108 may be low, indicating a bad health score (e.g., that the cooling system 108 is unhealthy). Using the determined health score of the cooling system 108 of the first vehicle 104b, the method continues to one or more of 414, 416 or 418.

In one embodiment, the monitoring device 310 determines the health score of the cooling system 108 of the first vehicle 104b by linearly combining the digital twin matrix of the cooling system 108 of the first vehicle 104b with an average or median of the plural digital twin matrices of the additional vehicles 104a, 104c, 104d. Optionally, the monitoring device 310 may determine the health score using alternative methods.

At 414, the monitoring device 310 predicts a likelihood of failure of the cooling system 108 of the first vehicle 104b based on the health score of the cooling system 108 of the first vehicle 104b. For example, the monitoring device 310 may determine a low health score of the cooling system 108, wherein the low health score is below a designated limit. The monitoring device may indicate a high likelihood of failure of the cooling system 108 based on the low health score that is below the designated limit. The monitoring device 310 may provide a calculated percentage of potential failure, may indicate a pass/fail determination, may communicate to the operator of the digital twin system 120 using the output device 304 (e.g., an alarm, a bell, vibration, verbal communication, or the like), or the like.

At 416, the monitoring device 310 determines a value of the health score of the cooling system 108 of the first vehicle 104b based on a comparison between the health score of the first vehicle 104b and a determined health score of one or more additional cooling systems of the additional vehicles 104a, 104c, 104d. For example, the monitoring device 310 may determine that the cooling system 108 of the first vehicle 104b is valued higher than the cooling system of the additional vehicle 104a (e.g., the cooling system of the first vehicle 104b is healthier than the cooling system of the vehicle 104a). Optionally, the monitoring device 310 may determine that the cooling system 108 of the first vehicle 104b is valued lower than the cooling systems of the additional vehicles 104a, 104c, 104d (e.g., the cooling system of the first vehicle 104b has the lowest health value).

At 418, the digital twin system 120 sends a control signal to the vehicle control system 110 of the first vehicle 104b in order to change or control operation of the cooling system 108 of the first vehicle 104b based on the health score of the cooling system 108. For example, the monitoring device 310 may determine that the cooling system 108 of the first vehicle 104b has a low health score. The digital twin system 120 may communicate a control signal (e.g., communicate via the network communication link 124) to the vehicle control system 110 of the first vehicle 104b directing the first vehicle 104b to stop, increase a radiator fan speed, increase intercoolant fan speed, or the like. Additionally, or alternatively, the monitoring device 310 may determine that the cooling system 108 of the first vehicle 104b has a high health score. The digital twin system 120 may communicate a control signal to the vehicle control system 110 of the first vehicle 104b directing the first vehicle 104b to one or more of decrease a radiator fan speed, decrease an intercoolant fan speed, or the like.

Additionally or alternatively, at 418 the digital twin system 120 sends a control signal to the vehicle control system 110 of the first vehicle 104b in order to change or control operation of the cooling system 108 of the first vehicle 104b based on the operation of the cooling system 108 that is simulated. For example, the simulation device 326 may determine that the cooling system 108 of the first vehicle 104b will successfully complete a future trip based on the digital twin matrix of the cooling system 108 successfully completing the simulated operation. The digital twin system 120 may change or control an actual operation of the cooling system 108 of the first vehicle 104b based on the simulated completion. For example, the digital twin system 120 may dictate to decrease the radiator fan speed, decrease the intercoolant fan speed, or the like, of the cooling system 108. Alternatively, the simulation device 326 may determine that the cooling system 108 of the first vehicle 104b will not successfully complete a future trip based on the digital twin matrix of the cooling system 108 not successfully completing the simulated operation. The digital twin system 120 may change or control an actual operation of the cooling system 108 of the first vehicle 104b based on the simulated failure. For example, the digital twin system 120 may dictate to increase the radiator fan speed, increase the intercoolant fan speed, or the like, of the cooling system 108. The digital twin system 120 may dictate a change to the actual operation of the cooling system 108 of the first vehicle 104b such that the first vehicle 104b will successfully complete the future trip.

In one embodiment of the subject matter described herein, a system includes plural, different sensors each configured to be operably connected to a first vehicle. The sensors also are configured to obtain status data indicative of a state of a cooling system of the first vehicle, wherein at least some of the status data obtained by the different sensors differs in one or more of sampling rates or resolutions for at least two of the different sensors. The system includes a digital twin system having one or more processors configured to modify the at least some of the status data having the one or more of sampling rates or resolutions that differ for at least two of the different sensors such that the at least some of the status data that is modified has one or more of a common sampling rate or a common resolution as that of other data in the status data. The one or more processors are configured to create a digital twin matrix of the status data that is obtained and the at least some of the status data that is modified. The digital twin matrix is indicative of the state of the cooling system of the first vehicle. The one or more processors also configured to one or more of determine a health score of the cooling system of the first vehicle based on the digital twin matrix, or simulate operation of the cooling system of the first vehicle based on the digital twin matrix. The digital twin system is configured to change or control actual operation of the cooling system of the first vehicle based on one or more of the health score or the operation of the cooling system that is simulated.

In one aspect, the one or more processors are configured to predict a likelihood of failure of the cooling system of the first vehicle using the health score of the cooling system. Optionally, in one aspect the one or more processors are configured to predict a likelihood of failure of the cooling system of the first vehicle based on the operation that is simulated.

In one aspect, the one or more processors are configured to determine the health score by comparing the digital twin matrix of the cooling system of the first vehicle with reference data of a modeled cooling system. Optionally, in one aspect the reference data includes one or more of an ambient temperature, altitude, or barometric air pressure. Optionally, in one aspect the reference data includes one or more of simulated engine oil inlet temperature data, engine water inlet temperature data, or simulated manifold air temperature data. Optionally, in one aspect the status data of the cooling system of the first vehicle includes one or more of engine oil inlet temperature data, engine water inlet temperature data, or simulated manifold air temperature data.

In one aspect, the status data of the cooling system of the first vehicle includes one or more of engine oil inlet temperature data, engine water inlet temperature data, or simulated manifold air temperature data.

In one aspect, the first vehicle is one or more of an automobile, a rail vehicle, a truck, a marine vessel, a mining vehicle, an aerial drove, or another aerial vehicle.

In one aspect, the digital twin matrix of the cooling system of the first vehicle is a numerical representation of the cooling system of the first vehicle.

In one aspect, the health score of the cooling system of the first vehicle is determined by linearly combining the digital twin matrix of the cooling system of the first vehicle with an average or median of plural digital twin matrices of additional vehicles.

In one aspect, the one or more processors are configured to compare the health score of the cooling system of the first vehicle with a health score of plural digital twin matrices of additional vehicles in order to value the cooling system of the first vehicle with respect to the cooling systems of a fleet system. Optionally, in one aspect the fleet system includes the first vehicle and the additional vehicles.

In one embodiment of the subject matter described herein, a method includes obtaining, with plural, different sensors operably connected to a first vehicle, status data indicative of a state of a cooling system of the first vehicle. At least some of the status data obtained by the different sensors differs in one or more of sampling rates or resolutions for at least two of the different sensors. The method includes modifying the at least some of the status data having the one or more of sampling rates or resolutions that differ for at least two of the different sensors such that the at least some of the status data that is modified has one or more of a common sampling rate or a common resolution as that of other data in the status data. The method includes creating a digital twin matrix of the status data that is obtained and the at least some of the status data that is modified. The digital twin matrix is indicative of the state of the cooling system of the first vehicle. The method also includes one or more of determining a health score of the cooling system of the first vehicle based on the digital twin matrix, or simulating operation of the cooling system of the first vehicle based on the digital twin matrix. The method also includes changing or controlling actual operation of the cooling system of the first vehicle based on one or more of the health score or the operation of the cooling system that is simulated.

In one aspect, the method includes predicting a likelihood of failure of the cooling system of the first vehicle using the health score of the cooling system.

In one aspect, the method includes predicting a likelihood of failure of the cooling system of the first vehicle based on the operation that is simulated.

In one aspect, determining the health score includes comparing the digital twin matrix of the cooling system of the first vehicle with reference data of a modeled cooling system. Optionally, in one aspect the reference data includes one or more of an ambient temperature, altitude, or barometric air pressure.

In one embodiment of the subject matter described herein, a system includes a first sensor configured to be operably connected to a vehicle and configured to obtain first status data indicative of a state of a cooling system of the vehicle. The system includes a different, second sensor configured to be operably connected to the vehicle and configured to obtain different, second status data indicative of the state of the cooling system of the vehicle, wherein the second sensor is configured to obtain the second status data at one or more of a different sampling rate or resolution than the first sensor is configured to obtain the first status data. The system includes one or more processors configured to modify the first status data, the second status data, or both the first status data and the second status data to create modified status data such that the first status data and the second status data in the modified status data have one or more of a common sampling rate or a common resolution. The one or more processors also are configured to create a digital twin matrix of the modified status data. The digital twin matrix is indicative of the state of the cooling system of the vehicle. The one or more processors also are configured to one or more of determine a health score of the cooling system of the vehicle based on the digital twin matrix or simulate operation of the cooling system of the vehicle based on the digital twin matrix. The digital twin system is configured to change or control operations of the cooling system of the vehicle based on one or more of the health score or the operation of the cooling system that is simulated.

In one aspect, the one or more processors are configured to predict a likelihood of failure of the cooling system of the vehicle using the health score of the cooling system.

In one aspect, the one or more processors are configured to predict a likelihood of failure of the cooling system of the vehicle based on the operation that is simulated.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   plural, different sensors each configured to be operably connected to a first vehicle, the sensors also configured to obtain status data indicative of a state of a cooling system of the first vehicle, wherein at least some of the status data obtained by the different sensors differs in one or more of sampling rates or resolutions for at least two of the different sensors;
   a digital twin system having one or more processors configured to modify the at least some of the status data having the one or more of sampling rates or resolutions that differ for at least two of the different sensors such that the at least some of the status data that is modified has one or more of a common sampling rate or a common resolution as that of other data in the status data, wherein the one or more processors are configured to create a digital twin matrix of the status data that is obtained and the at least some of the status data that is modified, the digital twin matrix indicative of the state of the cooling system of the first vehicle, and one or more of:
      determine a health score of the cooling system of the first vehicle based on the digital twin matrix; or
      simulate operation of the cooling system of the first vehicle based on the digital twin matrix; and
   wherein the digital twin system is configured to change or control actual operation of the cooling system of the first vehicle based on one or more of the health score or the operation of the cooling system that is simulated.

2. The system of claim 1, wherein the one or more processors are configured to predict a likelihood of failure of the cooling system of the first vehicle using the health score of the cooling system.

3. The system of claim 1, wherein the one or more processors are configured to predict a likelihood of failure of the cooling system of the first vehicle based on the operation that is simulated.

4. The system of claim 1, wherein the one or more processors are configured to determine the health score by comparing the digital twin matrix of the cooling system of the first vehicle with reference data of a modeled cooling system.

5. The system of claim 4, wherein the reference data includes one or more of an ambient temperature, altitude, or barometric air pressure.

6. The system of claim 4, wherein the reference data includes one or more of simulated engine oil inlet temperature data, simulated engine water inlet temperature data, or simulated manifold air temperature data.

7. The system of claim 1, wherein the status data of the cooling system of the first vehicle includes one or more of engine oil inlet temperature data, engine water inlet temperature data, or manifold air temperature data.

8. The system of claim 1, wherein the first vehicle is one or more of an automobile, a rail vehicle, a truck, a marine vessel, a mining vehicle, an aerial drone, or another aerial vehicle.

9. The system of claim 1, wherein the digital twin matrix of the cooling system of the first vehicle is a numerical representation of the cooling system of the first vehicle.

10. The system of claim 1, wherein the health score of the cooling system of the first vehicle is determined by linearly combining the digital twin matrix of the cooling system of the first vehicle with an average or median of plural digital twin matrices of additional vehicles.

11. The system of claim 1, the one or more processors configured to compare the health score of the cooling system of the first vehicle with a health score of plural digital twin matrices of additional vehicles in order to value the cooling system of the first vehicle with respect to the cooling systems of a fleet system.

12. The system of claim 11, wherein the fleet system comprises the first vehicle and the additional vehicles.

13. A method comprising:
   obtaining, with plural, different sensors operably connected to a first vehicle, status data indicative of a state of a cooling system of the first vehicle, at least some of the status data obtained by the different sensors differing in one or more of sampling rates or resolutions for at least two of the different sensors;
   modifying the at least some of the status data having the one or more of sampling rates or resolutions that differ for at least two of the different sensors such that the at least some of the status data that is modified has one or more of a common sampling rate or a common resolution as that of other data in the status data;
   creating a digital twin matrix of the status data that is obtained and the at least some of the status data that is modified, the digital twin matrix indicative of the state of the cooling system of the first vehicle; and
   one or more of:
      determining a health score of the cooling system of the first vehicle based on the digital twin matrix; or
      simulating operation of the cooling system of the first vehicle based on the digital twin matrix; and
   changing or controlling actual operation of the cooling system of the first vehicle based on one or more of the health score or the operation of the cooling system that is simulated.

14. The method of claim 13, further comprising predicting a likelihood of failure of the cooling system of the first vehicle using the health score of the cooling system.

15. The method of claim 13, further comprising predicting a likelihood of failure of the cooling system of the first vehicle based on the operation that is simulated.

16. The method of claim 13, wherein determining the health score includes comparing the digital twin matrix of the cooling system of the first vehicle with reference data of a modeled cooling system.

17. The method of claim 16, wherein the reference data includes one or more of an ambient temperature, altitude, or barometric air pressure.

18. A system comprising:
   a first sensor configured to be operably connected to a vehicle and configured to obtain first status data indicative of a state of a cooling system of the vehicle;

a different, second sensor configured to be operably connected to the vehicle and configured to obtain different, second status data indicative of the state of the cooling system of the vehicle, wherein the second sensor is configured to obtain the second status data at one or more of a different sampling rate or resolution than the first sensor is configured to obtain the first status data; and a digital twin system having one or more processors configured to modify the first status data, the second status data, or both the first status data and the second status data to create modified status data such that the first status data and the second status data in the modified status data have one or more of a common sampling rate or a common resolution, the one or more processors also configured to create a digital twin matrix of the modified status data, the digital twin matrix indicative of the state of the cooling system of the vehicle, the one or more processors also configured to one or more of determine a health score of the cooling system of the vehicle based on the digital twin matrix or simulate operation of the cooling system of the vehicle based on the digital twin matrix, wherein the digital twin system is configured to change or control operation of the cooling system of the vehicle based on one or more of the health score or the operation of the cooling system that is simulated.

19. The system of claim 18, wherein the one or more processors are configured to predict a likelihood of failure of the cooling system of the vehicle using the health score of the cooling system.

20. The system of claim 18, wherein the one or more processors are configured to predict a likelihood of failure of the cooling system of the vehicle based on the operation that is simulated.

* * * * *